United States Patent [19]

Brodnax

[11] Patent Number: 4,879,675

[45] Date of Patent: Nov. 7, 1989

[54] PARITY GENERATOR CIRCUIT AND METHOD

[75] Inventor: Timothy B. Brodnax, Arlington, Va.

[73] Assignee: International Business Machines Corporation, Armonk, N.Y.

[21] Appl. No.: 156,626

[22] Filed: Feb. 17, 1988

[51] Int. Cl.$^4$ ............................................. G06F 11/10
[52] U.S. Cl. ..................................... 364/738; 371/49.2
[58] Field of Search ....................... 364/738, 200, 900; 371/49

[56] References Cited

U.S. PATENT DOCUMENTS

| | | |
|---|---|---|
| 3,287,546 | 2/1963 | Geller .................................. 364/738 |
| 3,342,983 | 9/1967 | Pitkowsky ........................... 364/738 |
| 3,596,072 | 7/1971 | Iwamoto . |
| 3,758,760 | 9/1973 | Cowan . |
| 3,925,647 | 12/1975 | Louie . |
| 4,224,680 | 9/1980 | Miura . |
| 4,608,693 | 8/1986 | Baranyai et al. . |

OTHER PUBLICATIONS

P. A. Kuckein, "High Speed Parity Predictor for Adder," IBM TDB, Jul. 1974, pp. 540–542.
K. E. Olin et al., "Parity Prediction for Fast Three-Input Adder," IBM TDB, Sep. 1979, pp. 1563–1568.
H. Askin et al., "Increment/Decrement and Adder Programmable Logic Arrays with Check Circuits," IBM TDB, Oct. 1980 pp. 1995–1998.
R. J. Easter, "High-Order Byte Optimization for Increments," IBM TDB, Jan. 1982, pp. 4390–4392.
S. A. Hallman, "Error Checking for a Full Carry Look-Ahead Adder," IBM TDB, Mar. 1985, pp. 6241–6248.
D. A. Shah, "100% Error Detection Scheme for Carry Save and Carry Look-Ahead Adders," IBM TDB, Feb. 1986, pp. 3736–3737.

*Primary Examiner*—Jerry Smith
*Assistant Examiner*—Robert W. Beausoliel
*Attorney, Agent, or Firm*—John E. Hoel

[57] ABSTRACT

The parity generation circuit which is disclosed takes advantage of a property of the parity of a number before and after it has been incremented. This is characterized as the parity toggle property and it allows parity generation to be done on the most significant bits of an adder before the carry input to these most significant bits has been generated from the least significant bit portion of the sum produced by the adder. The final parity for the entire sum output of the addition process is adjusted quickly when the carry into the most significant bits of the sum becomes available from the least significant bit portion of the sum output. The parity toggle property of the invention allows for the quick adjustment of the parity without incurring the undue delay of waiting for the production of the carry output from the low order sum before commencing computations with the high order sum.

10 Claims, 5 Drawing Sheets

FIG. 2.

PARITY TOGGLE PRINCIPLE

| BEFORE INCREMENTER | AFTER INCREMENTER | TOGGLE PARITY |
|---|---|---|
| XXXX0 | XXXX1 | YES |
| XXX01 | XXX10 | NO |
| XX011 | XX100 | YES |
| X0111 | X1000 | NO |
| 01111 | 10000 | YES |
| EVEN CONSEC 1s FOR LSBs | EVEN CONSEC 0s FOLLOWED BY 1 | YES |
| ODD CONSEC 1s FOR LSBs | ODD CONSEC 0s FOLLOWED BY 1 | NO |

X = DON'T CARE

FIG. 3.

EXAMPLE 1

A = 0010 1001 1111 0000          B = 0100 1010 0010 1101

M = 8
N = 8

AH = 0010 1001                   BH = 0100 1010
AL = 1111 0000                   BL = 0010 1101

```
    AH         BH                    AL         BL
 0010 1001  0100 1010             1111 0000  0010 1101
         \  /                              \  /
         \__/ —14                          \__/ —20
          |                      CL=1        |
          ↓                        |         ↓
   SH'=0111 0011                        SL=0001 1101
```

```
┌─────────┐   ┌─────────┐              ┌─────────┐
│ PARITY  │18 │ PARITY  │16            │ PARITY  │22
│ TOGGLE  │   │GENERATOR│              │GENERATOR│
│ MEANS   │   └─────────┘              └─────────┘
└─────────┘        |                        |
     |           PH'=1                     PL=0
   PTOG=1
```

M = 8
PTOG = (NOT S0) OR (NOT S2 AND S1)
   OR (NOT S4 AND S3 AND S1)
   OR (NOT S6 AND S5 AND S3 AND S1)
   OR (S7 AND S5 AND S3 AND S1)

S0 = S1 = 1, S2 = 0
(NOT S2) AND S1 = 1
PTOG = 1

AND —24
XOR —26

PS = 0

SUM = 0111 0100 0001 1101

EXAMPLE 2B

PARITY GENERATOR CIRCUIT AND METHOD

BACKGROUND OF THE INVENTION

1. Technical Field

The invention disclosed broadly relates to a data processing technology and more particularly relates to improvements in arithmetic circuitry especially for the generation of parity bit values.

2. Background Art

The practice of producing a parity bit to be associated with a byte or multiple byte expression of a numeric value is well-known in the art, and is used as a means to insure that single bit errors which occur in the byte or multiple byte expression can be detected and with appropriate circuitry, corrected. The production of a parity bit finds its best use in the detection of errors which occur during the transmission of a byte or multiple byte expression over a communications medium. Conventionally, parity can be considered as either even parity or odd parity. Odd parity is defined herein as a binary bit P having a value of one when the byte or multiple byte expression with which it is associated has an odd number of ones contained therein. Even parity is by definition herein the binary value of a parity bit $P_e=1$ when there are an even number of ones in the byte or multiple byte expression associated therewith. For uniformity of discussion herein, odd parity will be employed as the form of parity to be discussed. The choice of even or add parity is merely a local convention, either choice providing essentially the same results.

In the prior art, the classic technique for generating the parity of a sum output of an N bit adder is to apply the N bits of the sum output to an N bit exclusive OR (in reality an exclusive OR tree) so as to produce a single binary bit for the odd parity value associated with the N bit sum. The problem in the prior art of producing parity in this classical manner is the duration required, since one must wait for the carry bit to propagate over all of the N bits producing the N bit sum, in order to be able to apply all N bits to the N bit input of the exclusive OR parity generator. A number of techniques have been attempted in the prior art to reduce the duration necessary to compute the parity of the sum output of an N bit adder. However all have failed in either requiring extensive logic and therefore a large area to occupy on an integrated circuit chip in order to embody a complex logic function which is sufficiently fast or else they suffer relatively slow operation because of the number of logic delays necessary to generate sufficient information to establish the parity value.

OBJECTS OF THE INVENTION

It is therefore an object of the invention to generate parity at the output of an adder in an improved manner.

It is another object of the invention to generate parity in a faster manner at the output of an adder, than has been available in the prior art.

It is still a further object of the invention to generate parity of the sum of an adder with a minimum delay at a small logic cell cost.

SUMMARY OF THE INVENTION

These and other objects, features and advantages of the invention are accomplished by the improved parity generation circuit and method disclosed herein. The parity generation circuit which is disclosed takes advantage of a property of the parity of a number before and after it has been incremented. This is characterized as the parity toggle property and it allows parity generation to be done on the most significant bits of an adder before the carry input to these most significant bits has been generated from the least significant bit portion of the sum produced by the adder. The final parity for the entire sum output of the addition process is adjusted quickly when the carry into the most significant bits of the sum becomes available from the least significant bit portion of the sum output. The parity toggle property of the invention allows for the quick adjustment of the parity without incurring the undue delay of waiting for the production of the carry output from the low order sum before cummencing computations with the high order sum.

BRIEF DESCRIPTION OF THE DRAWINGS

These and other objects, features and advantages of the invention will be more fully appreciated with reference to the accompanying figures.

FIG. 2 illustrates the parity toggle logic principle.

FIG. 3 is an example of the operation of the invention for 16 bit operands.

DESCRIPTION OF THE BEST MODE FOR CARRYING OUT THE INVENTION

Figure 1:
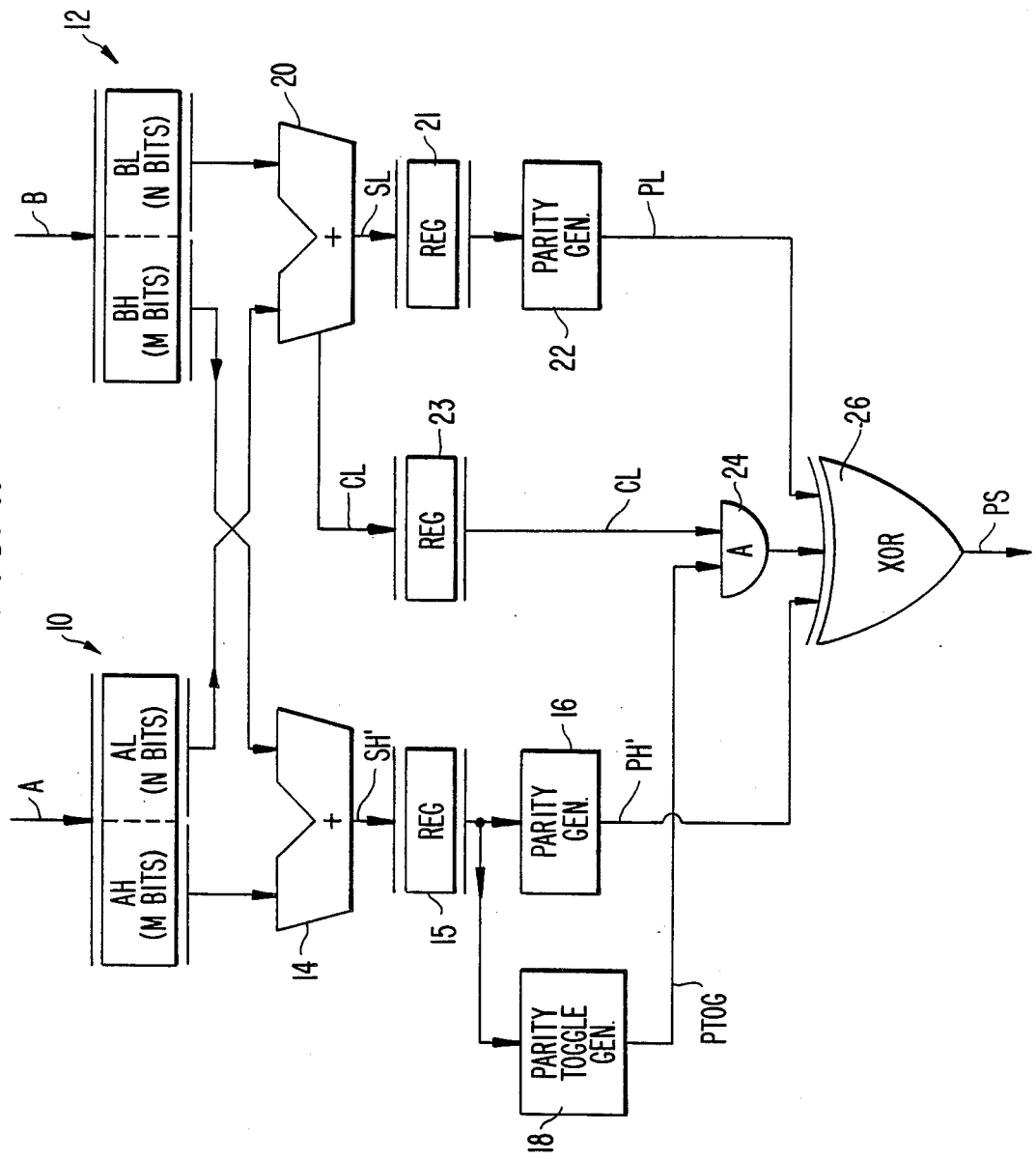
FIG. 1 is a logic diagram of the improved parity generator circuit invention.

The principle of operation of the invention is set forth in the table of FIG. 2 and is further described in the functional block diagram of FIG. 1. The improved parity generator for the sum output of an adder is shown in FIG. 1. First input operand A has M high order bits AH and N low order bits AL applied to a first register 10 in FIG. 1. A second input operand B has M high order bits BH and N low order bits BL applied to the input register 12. The operands A and B are to be added in a two input adder associated with the parity generator circuit. The sum of that addition is to have its parity established and that is the objective of the improved parity generator invention.

The parity generator circuit of FIG. 1 has a first M bit adder 14 which has a first M bit operand AH and a second M bit operand BH from the registers 10 and 12 of FIG. 1, and the adder 14 produces an M bit high order sum SH' without carry. In accordance with the invention, the adder 14 will not use a carry input. Therefore, any existing adder circuit which is used to implement adder 14 must have its carry input terminal disabled, usually by connecting it to a logial zero.

A first parity generator 16 of FIG. 1 is connected to the sum output of the M bit adder 14, for producing a high order parity bit without carry PH'.

A parity toggle means 18 is shown in FIG. 1. The parity toggle means 18 can be a random access memory (RAM) or read only memory (ROM) or a program logic array (PLA) or a complex logic function which carries out the parity toggle operation. The parity toggle mechanism 18 has an input connected to the sum output of the M bit adder 14, for producing a parity toggle bit having a binary value of one if there are an even number of binary ones to the right of the first binary zero in the sum output of the M bit adder 14.

Alternately, the parity toggle bit produced by the parity toggle means 18 will have a binary value of zero if there are an odd number of binary ones to the right of the first binary zero in the sum output of the M bit adder 14. An M bit register 15 is shown between the sum output of the adder 14 and the parity generator 16 and the parity toggle means 18, and is used for the purpose of temporarily storing the sum output from the adder 14.

The improved parity generator of FIG. 1 further includes an N bit adder 20 having a N bit value AL applied as a first operand input thereto and having an N bit value BL applied as a second operand input thereto from the registers 10 and 12 of FIG. 1. The adder 20 produces an N bit low order sum SL and a low order carry bit CL.

An N bit register 21 is connected to the sum output of the adder 20, for temporarily storing the sum value output from the adder 20. The single bit register 23 connected to the low order carry bit output of the adder 20 will provide a similar temporary storage for CL.

A second parity generator 22 shown in FIG. 1 has its input connected through the register 21 to the sum output of the N bit adder 20, for producing a low order carry bit PL.

An AND gate 24 has a first input connected to the parity toggle bit output from the parity means 28 and it has a second input connected, through register 23, to the low order carry bit CL output from the N bit adder 20, and it has an output.

A three input exclusive OR 26 is shown in FIG. 1 which has a first input connected to the output of the AND gate 24, a second input connected to the higher order parity without carry bit PH' from the first parity generator 16, and it has a third input connected from the low order parity bit PL of the second parity generator 22. The output of the three input exclusive OR 26 is the parity PS of the sum of the operands A and B.

In an alternate embodiment, the registers 10 and 12 of FIG. 1 could be eliminated and the inputs A and B directly applied to the adders 14 and 20. Similarly, the registers 15, 21 and 23 could be eliminated in FIG. 1.

The AND gate 24 and exclusive OR 26 perform a compound logical operation of combining the four inputs Ptog, PH', CL and PL by ANDing and exclusive ORing these binary values to obtain PS, as described. There are many other combinations of elementary logic elements which can be combined to accomplish this compound logical operation.

The specific embodiment described herein is based on an odd parity for parity generators 16 and 22. If parity generator 16 were instead, an even parity generator, then it would output the complement binary value (not PH'), which can be logically compensated for by an inversion or an equivalent logical operation. The same would be true for parity generator 22, if it employed even parity, instead of the odd parity disclosed for the specific embodiment.

Referring to FIG. 2, the parity toggle means operates in the following manner. Let S0, S1, S2 ... be the sequence of bits from low order to high order which are SH' output from the M bit adder 14. Then the binary expression for the parity toggle bit Ptog at the output of the parity toggle means 18, is:

When M is odd,
Ptog=(not S0) or (not S2 and S1)
or (Not S4 and S3 and S1)
or ...
or (not SQ and S(Q-1) and S(Q-3) and ... and S3 and S1),
Where Q=M−1.

When M is even,
Ptog=(not S0) or (not S2 and S1)
or (not S4 and S3 and S1)
or ...
or (Not S(Q-1) and S(Q-2) and S(Q-4) and ... and S3 and S1)
or (SQ and S(Q-2) and S(Q-4) and ... and S3 and S1),
Where Q=M−1.

FIG. 3 is an example of the operation of the invention for 16 bit operands A and B. The example 1 of FIG. 3 chooses the partitioning of the operands so that M=8 and N=8. FIG. 3 further shows the binary values for AH and BH being applied to the adder 14 producing the sum output SH' which is applied to the parity toggle means 18 and the parity generator 16. SH' has as its bits from the low order value S0 to the high order value S7 as follows: S0=1, S1=1, S2=0, S3=0, S4=1, S5=1; S6=1 and S7=0. These values are applied in the parity toggle means 18 in the manner set forth in the above expression for Ptog. Since the value of M=8 which is even, Ptog is computed by the parity toggle means 18 to have a binary value of 1. This value is output by the parity toggle means 18 to the AND gate 24, as previously described. Parity generator 16, being an odd parity generator, produces a parity value PH'=1 which is applied to one of the inputs of the exclusive OR 26.

Further in example 1 of FIG. 3, the values of AL and BL are applied to the adder 20 which produces a sum output SL as shown in FIG. 3 and the carry output CL=1. The sum output SL is applied to the parity generator 22, which is an odd parity generator, thereby producing a parity value PL=0, which is output to another input of the exclusive OR 26. The carry output CL from the adder 20 is applied to one of the inputs of the AND gate 24. The output of the AND gate 24 is applied to the third input of the exclusive OR 26. The exclusive OR 26 then outputs the value PS=0 which is the odd parity for the sum of the operands A and B. In accordance with the invention, it should be observed that there is no necessity for waiting for the generation of a carry value in the addition of the low order sum SL by the adder 20, before the addition of the high order values AH and BH can be completed by the adder 14. The operation of the adder 14 and the parity toggle means 18 and the parity generator 16 can therefore be carried out in parallel with the operation of the adder 20 and the parity generator 22, so that the resultant logical combination of the values Ptog, PH', PL, and CL are made available to the AND gate 24 and the exclusive OR gate 26 in a faster manner than would have been possible if the adder 14 were required to wait for a carry value output from the low order computation.

Figure 4:
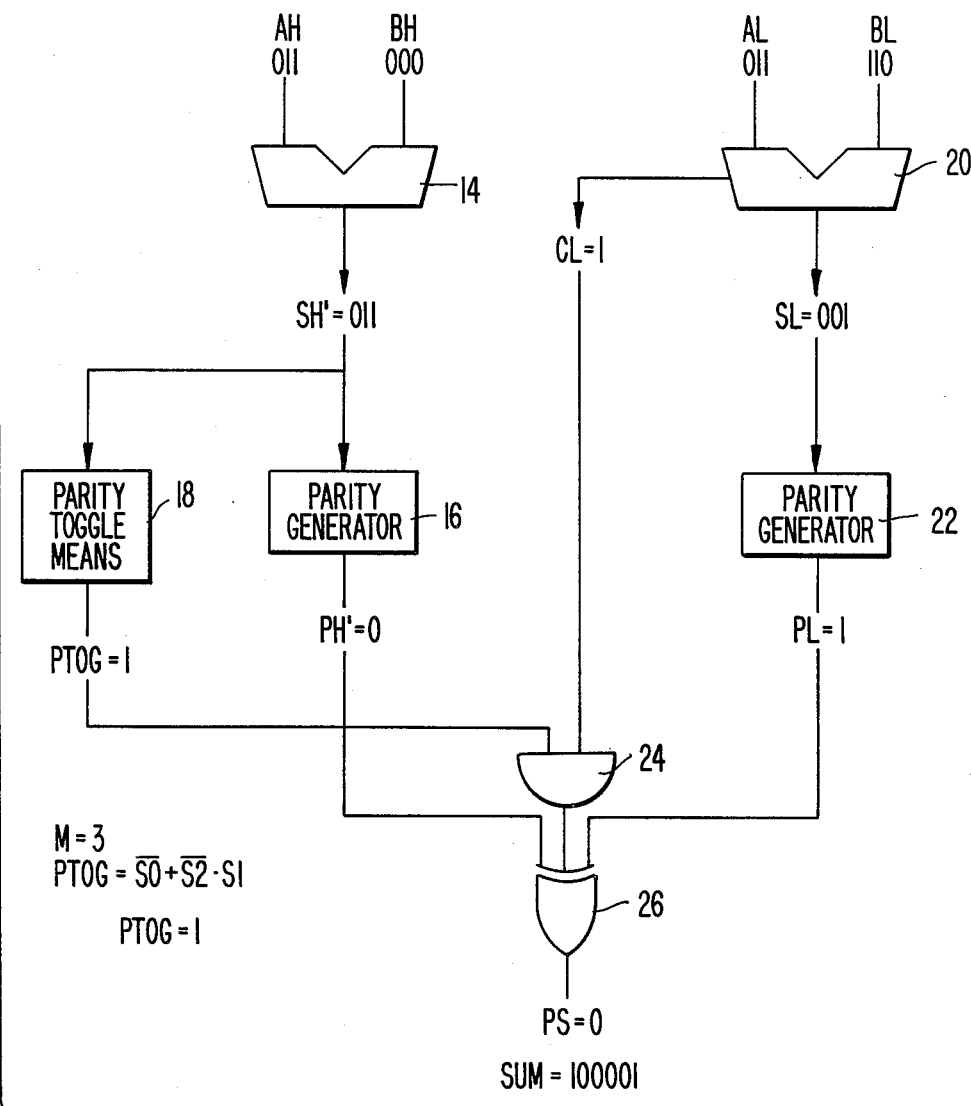
FIG. 4 is an example of the operation of the invention for 6 bit operands with M odd.
Figure 5:
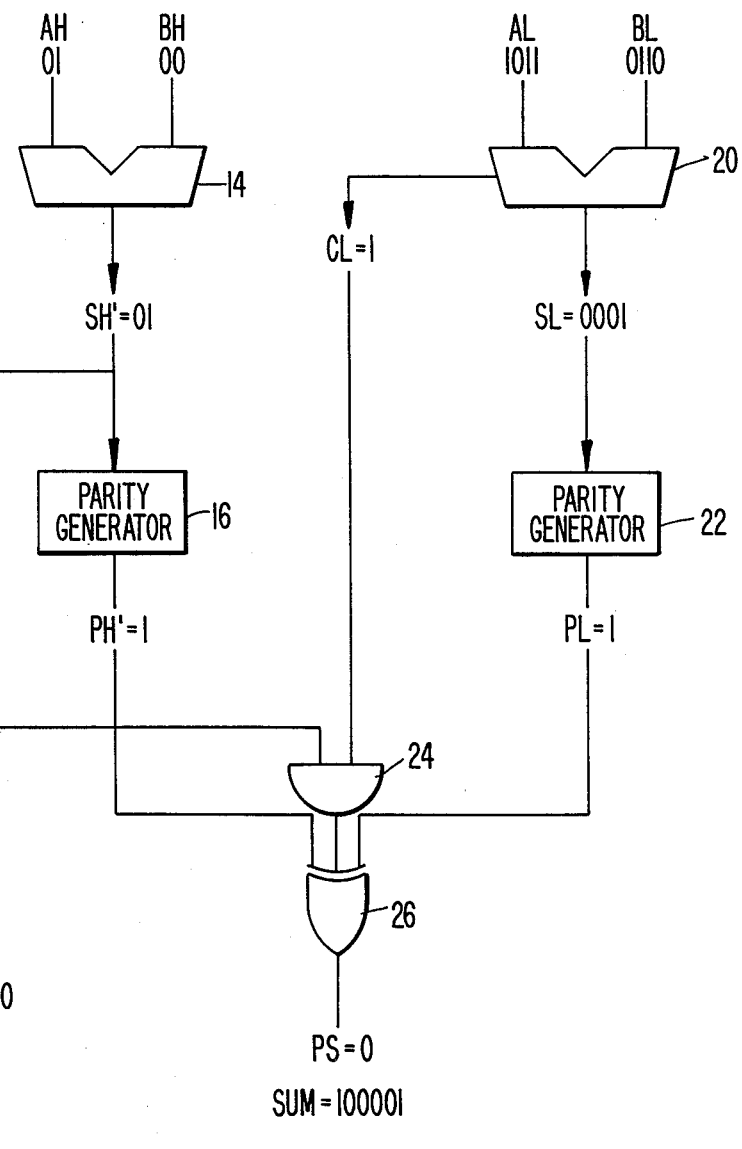
FIG. 5 is an example of the operation of the invention for 6 bit operands with M even.

FIG. 4 and FIG. 5 provide an example of the generation of the parity for the sum of two 6 bit operands, where the partitioning of the operands is changed from odd to even, in order to further illustrate the invention. The operands A and B in example 2A of FIG. 4 are the same as the operands A and B of the example 2B of FIG. 5. However, in FIG. 4, the value M for the number of bits in AH and BH is an odd value, whereas the value of M in FIG. 5 is an even value. As can be seen in FIG. 4, the parity toggle means 18 generates a value of Ptog of 1, a value for the parity PH' of 0, a value for CL of 1 and a value of PL of 1. In contrast, in the example of FIG. 5 where M is even, the parity toggle means generates a values of Ptog of 0, the parity value of PH'=1, the carry CL=1 and the value of parity PL=1. However, as can be seen from the examples of FIGS. 4 and 5, the resultant parity of the sum of the two operands A and B is PS=0 for both examples, 2A and 2B. Thus it can be seen that the invention can be applied to a variety of choices in the partitioning of the operands A and B.

In this manner, the parity of the sum of two operands A and B is produced in a more efficient manner than has been available in the prior art.

Although a specific embodiment of the invention has been disclosed, it will be understood by those having skill in the art that minor changes can be made to the form and details of the disclosed embodiment without departing from the spirit and the scope of the invention.

What is claimed is:

1. An improved parity generator for the sum output of an adder having a first input operand A with M high order bits AH and N low order bits AL and a second input operand B having M high order bits BH and N low order bits BL, where A and B are to be added and the sum of which is to have its parity established, comprising:

an M bit adder having a first M bit operand AH and a second M bit operand BH and producing an M bit high order sum SH';

a first parity generator connected to the sum out of said M bit adder for producing a high order parity bit PH';

a parity toggle means having an input connected to the sum output of said M bit adder for producing a parity toggle bit having a binary value of one if there are an even number of ones to the right of the first zero in the sum output of said M bit adder or alternately producing a parity toggle bit having a binary value of zero if there are an odd number of ones to the right of the first zero in the sum output of said M bit adder;

an N bit adder having said N bit value AL applied as a first operand input thereto and having said N bit value BL applied as a second operand input thereto and producing an N bit low order sum SL and a low order carry bit CL;

a second parity generator having an input connected to said sum output of said N bit adder, for producing a low order parity bit PL;

an ANDing means having a first input connected to said parity toggle bit output from said parity toggle means and a second input connected to said low order carry bit CL output from said N bit adder, and having an output;

an exclusive ORing means having a first input connected to said output of said ANDing means, a second input connected to said high order parity bit PH' from said first parity generator and a third input from said low order parity bit PL from said second parity generator, the output of said exclusive ORing means being the parity of the sum of the operand A and B;

whereby the parity of the sum of two operands is produced.

2. The apparatus of claim 1 wherein said parity toggle means further comprises:

when M is odd, said parity toggle bit
= (not S0) or (not S2 and S1)
or (not S4 and S3 and S1)
or ...
or (not SQ and (S(Q-1) and S(Q-3) and ... and S3 and S1), where Q=M−1, where S0, S1, S2 are the sequence of bits from low order to high order which are output from said M bit adder.

3. The apparatus of claim 1 wherein said parity toggle means further comprises:

when M is even, said parity toggle bit
= (not S0) or (not S2 and S1)
or (not S4 and S3 and S1)
or ...
or (not S(Q-1) and S(Q-2) and S(Q-4) and ... and S3 and S1)
or (SQ and S(Q-2) and S(Q-4) and ... and S3 and S1), where Q=M−1, where S0, S1, S2 are the sequence of bits from low order to high order which are output from said M bit adder.

4. The apparatus of claim 1, wherein said first and second parity generators generate odd parity values.

5. The apparatus of claim 1, wherein said first and second parity generators generate even parity values.

6. An improved parity generator for the sum output of an adder having a first input operand A with M high order bits AH and N low order bits AL and a second input operand B having M high order bits BH and N low order bits BL, where A and B are to be added and the sum of which is to have its parity established, comprising:

an M bit adder having a first M bit operand AH and a second M bit operand BH and producing an M bit high order sum SH';

a first parity generator connected to the sum out of said M bit adder for producing a high order parity bit PH';

a parity toggle means having an input connected to the sum output of said M bit adder for producing a parity toggle bit having a binary value of one if there are an even number of ones to the right of the first zero in the sum output of said M bit adder or alternately producing a parity toggle bit having a binary value of zero if there are an odd number of ones to the right of the first zero in the sum output of said M bit adder;

an N bit adder having said N bit value AL applied as a first operand input thereto and having said N bit value BL applied as a second operand input thereto and producing an N bit low order sum SL and a low order carry bit CL;

a second parity generator having an input connected to said sum output of said N bit adder, for producing a low order parity bit PL;

logic means having a first input connected to said parity toggle bit output from said parity toggle means, a second input connected to said low order carry bit CL output from sand N bit adder, a third input connected to said high order parity bit PH' from said first parity generator and a fourth input from said low order parity bit PL from said second parity generator, for outputting the parity of the sum of the operands A and B;

whereby the parity of the sum of two operands is produced.

7. The apparatus of claim 6 wherein said parity toggle means further comprises:

when M is odd, said parity toggle bit

= (not S0) or (not S2 and S1)
or (not S4 and S3 and S1)
or ...
or (not SQ and (S(Q-1) and S(Q-3) and ... and S3 and S1),
where Q=M−1,
where S0, S1, S2 are the sequence of bits from low order to high order which are output from said M bit adder.

8. The apparatus of claim 6 wherein said parity toggle means further comprises:

When M is even, said parity toggle bit
= (not S0) or (not S2 and S1)
or (not S4 and S3 and S1)
or ...
or (not S(Q-1) and S(Q-2) and S(Q-4) and ... and S3 and S1)
or (SQ and S(Q-2) and S(Q-4) and ... and (S3 and S1)
where Q=M−1,
where S0, S1, S2 are the sequence of bits from low order to high order which are outputs from said M bit adder.

9. The apparatus of claim 6, wherein said first and second parity generators generate odd parity values.

10. The apparatus of claim 6, wherein said first and second parity generators generate even parity values.

* * * * *